US008767553B2

(12) United States Patent  
Kokku et al.

(10) Patent No.: US 8,767,553 B2  
(45) Date of Patent: Jul. 1, 2014

(54) DYNAMIC RESOURCE PARTITIONING FOR LONG-TERM FAIRNESS TO NON-ELASTIC TRAFFIC ON A CELLULAR BASESTATION

(75) Inventors: Ravindranath Kokku, Hyderabad (IN); Rajesh Mahindra, Highland Park, NJ (US); Honghai Zhang, Ewing, NJ (US); Sampath Rangarajan, Bridgewater, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 445 days.

(21) Appl. No.: 13/170,665

(22) Filed: Jun. 28, 2011

(65) Prior Publication Data  
US 2012/0002544 A1   Jan. 5, 2012

Related U.S. Application Data

(60) Provisional application No. 61/437,168, filed on Jan. 28, 2011, provisional application No. 61/360,593, filed on Jul. 1, 2010, provisional application No. 61/361,009, filed on Jul. 2, 2010.

(51) Int. Cl.
| | |
|---|---|
| *H04L 12/26* | (2006.01) |
| *H04L 12/56* | (2006.01) |
| *H04W 28/02* | (2009.01) |
| *H04W 28/10* | (2009.01) |

(52) U.S. Cl.  
CPC .......... *H04W 28/02* (2013.01); *H04L 47/2441* (2013.01); *H04L 47/19* (2013.01); *H04W 28/10* (2013.01); *H04L 47/14* (2013.01); *H04L 47/22* (2013.01); *H04L 47/2408* (2013.01)  
USPC ...................................... 370/237; 370/230.1

(58) Field of Classification Search  
None  
See application file for complete search history.

(56) References Cited

U.S. PATENT DOCUMENTS

| | | | | |
|---|---|---|---|---|
| 6,631,122 | B1 * | 10/2003 | Arunachalam et al. | 370/332 |
| 6,981,052 | B1 * | 12/2005 | Cheriton | 709/232 |
| 8,689,272 | B2 * | 4/2014 | Bartholomay et al. | 725/116 |
| 2007/0296854 | A1 * | 12/2007 | Berkey et al. | 348/412.1 |
| 2010/0329118 | A1 * | 12/2010 | Adams | 370/235 |
| 2011/0292796 | A1 * | 12/2011 | Stanwood et al. | 370/230 |
| 2012/0134397 | A1 * | 5/2012 | Cioffi et al. | 375/222 |

\* cited by examiner

*Primary Examiner* — Ian N Moore  
*Assistant Examiner* — Eric P Smith  
(74) *Attorney, Agent, or Firm* — Joseph Kolodka

(57) ABSTRACT

A method includes receiving non-elastic traffic into a cellular network serving users; varying long-term dissatisfaction of the users with dynamic resource allocations during traffic overload of the cellular network, the long term dissatisfaction being measured by at least one of a function of number of times a user from the users receives bad quality of service and a level of deterioration of quality of service to the user; and influencing number of satisfied users of the cellular network responsive to the varying of long-term dissatisfaction.

8 Claims, 3 Drawing Sheets

DYNAMIC RESOURCE PARTITIONING FOR LONG-TERM FAIRNESS TO NON-ELASTIC TRAFFIC ON A CELLULAR BASESTATION

This application claims the benefit of U.S. Provisional Application No. 61/360,593, entitled, "Farsighted Flow Management for Video delivery in Broadband Wireless Networks", filed Jul. 1, 2010; and is related to U.S. Provisional Application No. 61/437,168, entitled, "REVA: Remote Virtualization of Wireless Resources on Cellular Basestations", filed Jan. 28, 2011; and related to U.S. Provisional Application No. 61/361,009, entitled, "Method for Remotely Virtualizing a Cellular Basestation", filed Jul. 2, 2010, of which the contents of all are incorporated herein by reference.

BACKGROUND OF THE INVENTION

The present invention relates generally to broadband and wireless communications and more particularly to a dynamic resource partitioning for long-term fairness to non-elastic traffic on a cellular basestation.

Resource partitioning is an important problem in cellular networks, especially with the emerging focus on non-elastic traffic, such as video, and the greater requirement for quality of user experience. Resource partitioning can be done with admission control for either voice traffic or for elastic data traffic such as Web surfing; this is because the bandwidth requirement of voice traffic is predictable, whereas elastic data traffic benefits incrementally from whatever bandwidth is available. However, with non-elastic traffic such as video, resource partitioning has to trade-off well between the number of users selected for service at any instant of time and the perceived quality of service.

For best performance, non-elastic application flows such as those carrying video traffic should ideally be "guaranteed" a minimum reservation of bandwidth. Further, only enough number of flows should be admitted such that their reservations can be satisfied. However, statically reserving bandwidth to meet every flow's requirements wastes precious wireless resources when there is not enough traffic for the flows that reserved bandwidth. Admitting more flows can improve utilization, but at the cost of violating the minimum reservations of bandwidth when all flows have packets to transmit. Violating the minimum reservations can have adverse effects on the quality of experience perceived by users.

In the past, resource partitioning was done using admission control, which has been done by determining at the arrival time of a new user, whether a minimum bandwidth requirement of the new user can be met, and/or when admitting the new user does not adversely affect the quality of service QoS of the existing users. If not, the user is rejected. This approach, however, leads to long-term unfairness, since some users may get rejected greater number of times than others.

On the other hand, some other proposals include admitting greater number of video flows, and dropping lower priority packets during overload. While this approach works when packets are marked as higher and lower priority, it cannot handle flows where packets are not marked or are encrypted, or where packet dropping can be detrimental. The latter is more a common case scenario.

Accordingly, there is a need for better resource management across non-elastic flows in traffic on a cellular basestation.

BRIEF SUMMARY OF THE INVENTION

Referring now to FIG. 1 there is shown the exemplary architecture 100 for improved resource management across non-elastic flows, implemented as a part of a basestation 112. The inventive dynamic resource partitioning for long term fairness to non-elastic traffic includes a flow classifier 101 that feeds out to user-datagram-protocol UDP modules including high and low priority UDP modules 102, 103 respectively. The high and low priority UDP modules 102 and 103 include rate matching (107) and flow migration (108) aspects, while the high priority UDP module includes an earliest-deadline-first EDF scheduler 109 and the low priority UDP module includes a shortest-queue-first SQF scheduler 110. The flow classifier 101 also feeds to a distinct "other traffic" module 105. The traffic module 105, high priority module 102 and low priority module 103 output to a group priority/MAC scheduler 104.

In an alternative implementation of the invention, with an additional traffic-shaping component, the exemplary architecture 100 for carrying out the inventive dynamic resource allocation can be implemented in an external entity and attached to the basestation 201, as shown in FIG. 2. The other traffic module 105, high priority UDP module 102 and low priority UDP module 103 output to the group priority scheduler 104 coupled to an adaptive shaper 202 (traffic shaping component) which outputs to the basestation 201. The traffic module 105 can also directly output to the basestation 201. The basestation 201 provides periodic feedback to the adaptive shaper 202. The group priority scheduler 104 treats the other traffic as another slice. The group priority scheduler 104 ensures that a proportional amount of time or bandwidth is given to the inventive aspect 100 in comparison to other traffic flowing to the basestation 201.

In an alternative expression of the invention, a method includes receiving non-elastic traffic into a cellular network serving; influencing dissatisfaction of users on the cellular network by allocating information flows over the cellular network during traffic overload of the cellular network, the dissatisfaction being measured by at least one of a function of number of times a user from the users receives bad quality of service and a level of deterioration of quality of service to the user; and changing number of satisfied users of the cellular network responsive to the influencing dissatisfaction.

These and other advantages of the invention will be apparent to those of ordinary skill in the art by reference to the following detailed description and the accompanying drawings.

DETAILED DESCRIPTION

The present invention is directed to an inventive dynamic resource partitioning for long term fairness to non-elastic traffic carefully selects some flows for de-prioritizing in the short-term, and proposes a measure to ensure that all flows are similarly satisfied in the long term in response to network congestion. This approach ensures long-term fairness among users, while managing network load during congestion.

Through dynamic admission control, the inventive dynamic resource partitioning for long term fairness to non-elastic traffic makes the best choices in terms of user and packet scheduling during network overload, thereby improving the quality of user experience for a given set of network resources, with less complexity. This solution is especially useful with video traffic.

The inventive dynamic resource partitioning, implemented by the exemplary architecture 100, enables dynamic and fair, in the long-term, resource partitioning for video traffic and other non-elastic traffic, which is carried over user-datagram-protocol UDP-like unreliable transport protocols. Non-elastic traffic typically categorizes applications in which an allocation of bandwidth below a certain level becomes unusable by the application. Elastic traffic on the other hand can make use of whatever bandwidth is available.

Figure 1:
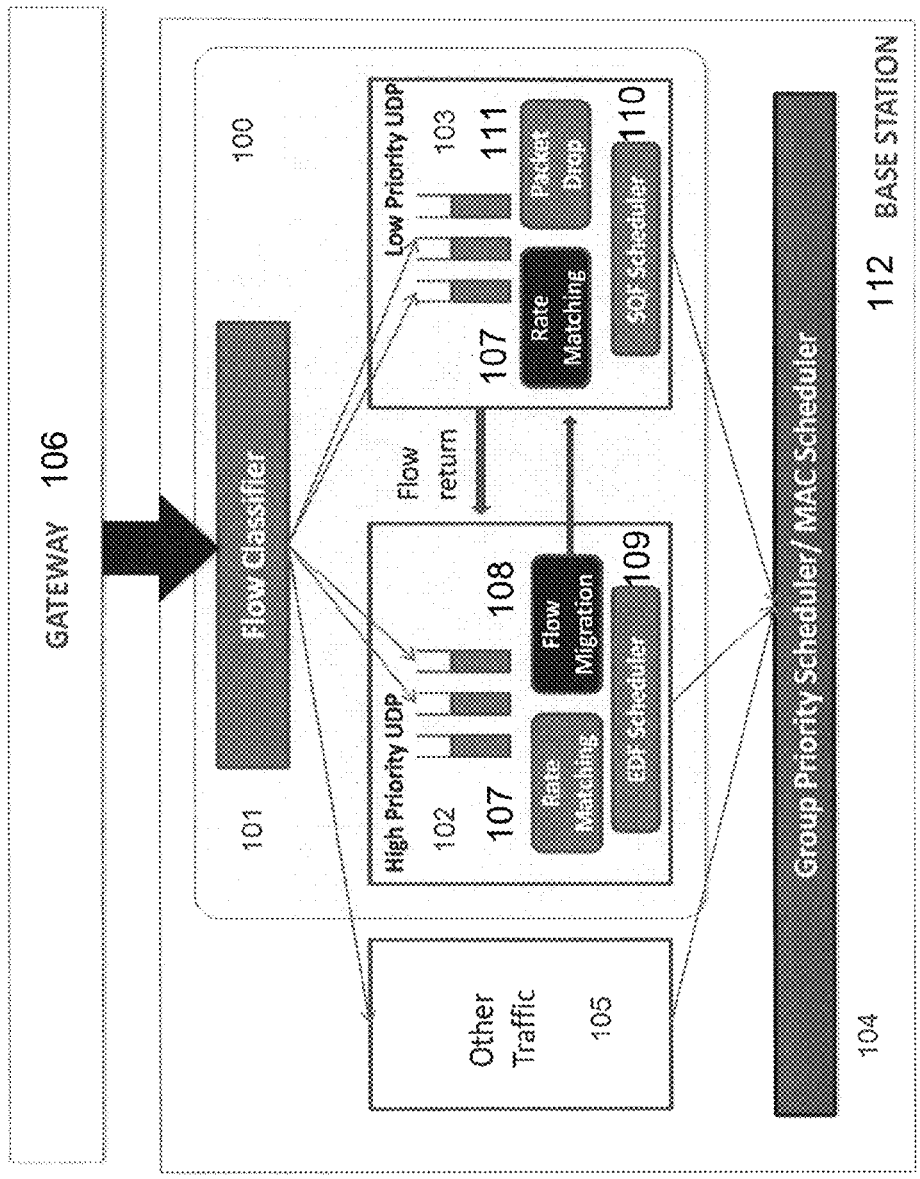
FIG. 1 depicts the exemplary architecture 100 for carrying out the inventive dynamic resource partitioning for long-term fairness to non-elastic traffic on a cellular basestation, implemented as a part of a basestation.

Referring now to FIG. 1 there is shown the exemplary architecture 100 for improved resource management across non-elastic flows, implemented as a part of a basestation. The inventive dynamic resource partitioning for long term fairness to non-elastic traffic includes a flow classifier 101 that feeds out to user-datagram-protocol UDP modules including high and low priority UDP modules 102, 103 respectively. The high and low priority UDP modules include rate matching and flow migration aspects, while the high priority UDP module includes an earliest-deadline-first EDF scheduler and the low priority UDP module includes a shortest-queue-first SQF scheduler. The flow classifier also feeds to a distinct "other traffic" module 105. The traffic module 105, high priority module 102 and low priority module 103 output to a group priority/MAC scheduler 104.

Figure 2:
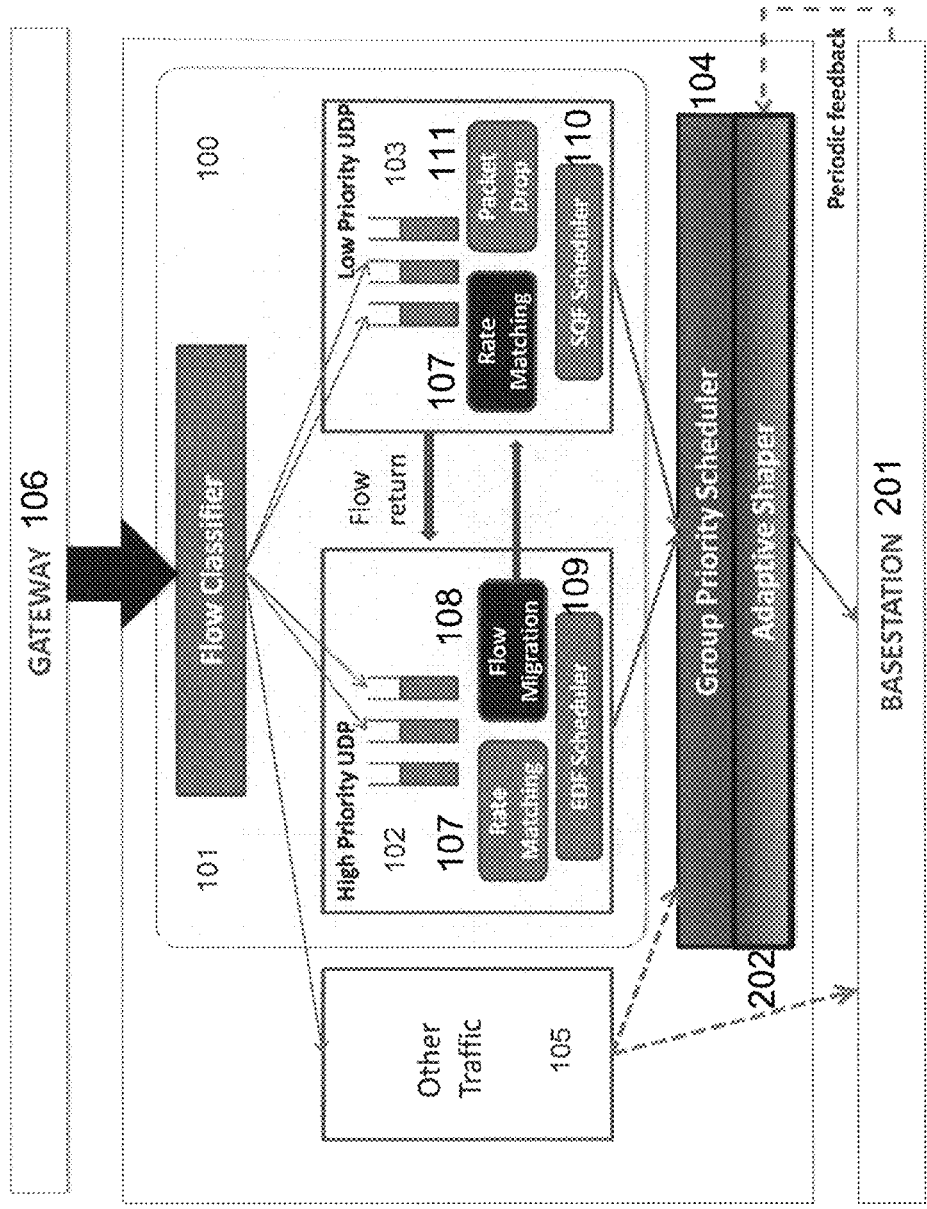
FIG. 2 depicts the exemplary architecture 100 for dynamic resource partitioning for long-term fairness to non-elastic traffic on a cellular basestation, implemented in an external entity and attached to the base station.

In an alternative implementation of the invention, with an additional traffic-shaping component, the exemplary architecture 100 for carrying out the inventive dynamic resource allocation can be implemented in an external entity and attached to the basestation, as shown in FIG. 2. The other traffic module 105, high priority UDP module 102 and low priority UDP module 103 output to the group priority scheduler coupled to an adaptive shaper (traffic shaping component) which outputs to the basestation. The traffic module 105 can also directly output to the basestation. The basestation provides periodic feedback to the adaptive shaper. The group priority scheduler treats the other traffic as another slice. The group priority scheduler ensures that a proportional amount of time or bandwidth is given to the inventive aspect 100 in comparison to other traffic flowing to the basestation.

The invention technique divides user flows carrying non-elastic traffic into two groups (or slices): one group will have higher priority than the other group. A flow is defined as any set of related packets transmitted to a user or a set of users. Resources are first allocated to flows within the high-priority group, and then spare resources are shared across the flows in the low priority group. Note that all users have equal probability of being placed in the high priority or low priority groups, and it does not depend on the service class of users (such as gold, silver and bronze). Although, if users are already categorized so in the system, the invention can easily incorporate such priority classes to tune (differently) the probability of placing a user into the low priority slice.

One of the key aspects of the inventive technique is the following: during system overload, the inventive dynamic resource allocation de-prioritizes service to some flows, in the interest of good service to other flows. We maintain a measure of user dissatisfaction (as a part of the user profile) when they are moved to the low priority slice, such that flows have equal probability of being dissatisfied, i.e. at each instant of overload, we select flows with currently low level of dissatisfaction to be moved to low priority slice. New flows first enter the high priority slice with the dissatisfaction measure obtained from the user profile. During overload, the inventive dynamic resource partitioning migrates selected flows from high-priority slice to the low priority slice for a configurable amount of time DELTA.

In one alternative, flows in the high-priority slice are de-queued by an earliest deadline first scheduler to ensure that maximum number of packets meet their deadlines. This choice delays flow migration as much as possible (i.e., as long a scheduling solution is feasible). Whereas, flows in the low priority slice are de-queued by a shortest queue first scheduler to ensure that maximum number of flows will have all their packets serviced.

For each flow in the low priority slice, the invention computes a deficit measure, which captures how satisfied a user is when receiving reduced service by being in the low priority slice.

In FIG. 2, the goal of the shaper is to de-queue the packets scheduled by the group scheduler 104 at a rate that is as close to the aggregate wireless capacity of the basestation 201 as possible. Without a shaper 202, since the aggregate bandwidth between the gateway 106 and the basestation 201 is typically much higher than the basestation wireless capacity itself, the order of packets scheduled by the invention would be reordered by the MAC scheduler executing in the basestation. To reduce interference from the basestation's scheduler, the shaper 202 ensures that the basestation 201's buffers are not backlogged at any time, hence ensuring the priority order.

Rate Matching, Flow Migration and Packet/Frame Discard:

In each slice, the invention keeps track of the average cumulative arrival and service rates of traffic and estimate overload conditions.

In the high priority slice,

```
If (arrival rate – service rate > Threshold1) {
    // OVERLOAD
    Migrate some flows with lowest current dissatisfaction to low priority
    slice, such that the arrival rate of remaining flows is just below the
    service rate.
    If two flows have the same level of dissatisfaction, choose the flow
    with lower channel quality.
}
```

Specifically, to avoid arbitrarily high arrival rates by misbehaving transmitters, we cap the arrival rate used in the condition above at the maximum allowed sustained rate for each user.

Once moved, each flow remains in the low priority slice for DELTA amount of time. DELTA is configurable by a network operator, based on average flow/session times, such as 1 minute, 2 minutes and 5 minutes.

In the low priority slice,

```
If (arrival rate – service rate > Threshold2) {
    // OVERLOAD
    In the increasing order of queue length, Drop packets "marked as low
    priority" if available, such that the remaining packets can be
    transmitted within their deadlines
    If marked packets not available, do nothing.
}
```

Per-flow queues with finite sizes are maintained, and incoming packets when the queue builds up may be dropped using a variety of active queue management policies such as RED, DropTail, etc.

Measure of Dissatisfaction:

the invention computes a running-average of the measure of dissatisfaction at the end of DELTA units of time in the low priority slice as follows.

deficit=average or median of bytes deficit (estimated every interval of configurable length) over the duration of time the user is in low priority slice dissatisfaction=Dissatisfaction+deficit*num. transitions to low priority slice when deficit was non-zero Using "num. transitions to low priority slice" ensures that users are dissatisfied fewer number of times, which seems to have greater impact on user experience. Deficit can be computed using other variants such as 60- or 90-percentile discrepancy in bytes.

After DELTA units of time, the flow is migrated to the high priority slice again. In the high priority slice, Every X KB served or every Y seconds, dissatisfaction is changed as follows Dissatisfaction=dissatisfaction−10 KB.

(Other reduction policies can be easily incorporated)

When Dissatisfaction reduces to zero, num.transitions is reset to zero.

The parameters X and Y are configurable based on system instantiation.

Figure 3:
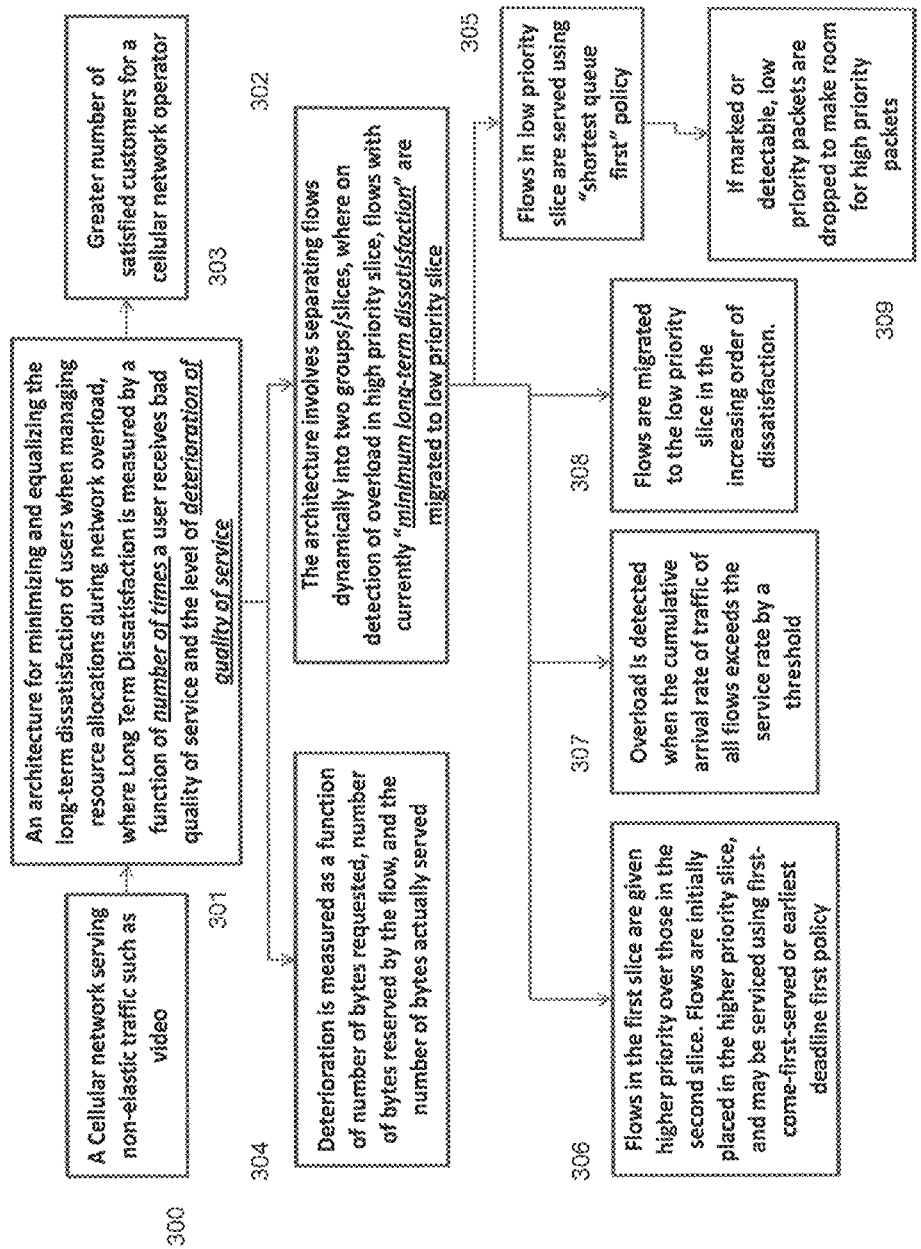
FIG. 3 is a flow diagram depicting the aspects of the inventive dynamic resource partitioning for long-term fairness to non-elastic traffic on a cellular basestation.

From the foregoing, key aspects of the inventive dynamic resource partitioning for long term fairness to non-elastic traffic on a cellular basestation are depicted in the diagram of FIG. 3. In the cellular network serving non-elastic traffic 300, such as video, the invention minimizes and equalizes the long-term dissatisfaction of users when managing resource allocations during network overload, where long term dissatisfaction is measured by a function of number of times a user receives bad quality of service and the level of deterioration of quality of service 301. The inventive dynamic resource partitioning allows for a greater number of satisfied customers for a cellular network operator 303.

Deterioration is measured as a function of number of bytes requested, number of bytes reserved by the flow, and the number of bytes actually served 304. The inventive architecture involves separating flows dynamically into two groups/slices, where on detection of overload in high priority slice, flows with currently "minimum long-term dissatisfaction" are migrated to low priority slice 302.

Flows in the first slice are given higher priority over those in the second slice. Flows are initially placed in the higher priority slice, and may be serviced using first-come-first-served or earliest deadline first policy 306. Overload is detected when the cumulative arrival rate of traffic of all flows exceeds the service rate by a threshold 307. Flows are migrated to the low priority slice in the increasing order of dissatisfaction 308.

Flows in the low priority slice are served using "shortest queue first" policy 305. If marked or detectable, low priority packets are dropped (111) to make room for high priority packets 309.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A method comprising:

receiving, at a base station, non-elastic traffic into a cellular network serving users;

varying long-term dissatisfaction of said users with dynamic resource allocations during traffic overload of said cellular network, said long term dissatisfaction being measured by at least one of a function of a number of times a user from said users receives a bad quality of service and a level of deterioration of a quality of service to said user; and influencing a number of satisfied said users of said cellular network responsive to said varying long-term dissatisfaction, wherein said varying comprises separating flows dynamically into two groups or slices, and migrating, upon detection of overload in a high priority slice, flows with a minimum long-term dissatisfaction to a low priority slice, and wherein said flows are migrated to the low priority slice in an increasing order of the long-term dissatisfaction and to the high priority slice after a configurable amount of time DELTA.

2. The method of claim 1, wherein said level of deterioration is a function of a number of bytes requested over said cellular network, the number of bytes reserved by flow on said cellular network, and the number of bytes actually served over said cellular network.

3. The method of claim 1, wherein said varying comprises giving flows in a first slice higher priority over flows in a second slice.

4. The method of claim 1, wherein said varying comprises initially giving flows higher priority and initially servicing said flows using a first-come-first-served or earliest deadline first policy.

5. The method of claim 1, wherein said overload is detected when a cumulative arrival rate of traffic of all flows exceeds a service rate of said network by a predetermined threshold.

6. The method of claim 1, wherein said flows in the low priority slice are served using a shortest queue first policy.

7. The method of claim 6, wherein if marked or detectable, packets of the flows in the low priority slice are dropped in favor of packets of the flows in the high priority slice.

8. A method comprising:

receiving, at a base station, non-elastic traffic into a cellular network serving users;

influencing long-term dissatisfaction of said users on said cellular network by allocating information flows over said cellular network during traffic overload of said cellular network, said dissatisfaction being measured by at least one of a function of a number of times a user from said users receives a bad quality of service and a level of deterioration of a quality of service to said user; and changing a number of satisfied said users of said cellular network responsive to said influencing, wherein said influencing comprises separating flows dynamically into two groups or slices, and migrating, upon detection of overload in a high priority slice, flows with a minimum long-term dissatisfaction to a low priority slice, and wherein said flows are migrated to the low priority slice in an increasing order of the long-term dissatisfaction and to the high priority slice after a configurable amount of time DELTA.

* * * * *